(12) United States Patent
Newton et al.

(10) Patent No.: US 12,284,406 B2
(45) Date of Patent: **\*Apr. 22, 2025**

(54) TECHNIQUES FOR COMPOSITE MEDIA STORAGE AND RETRIEVAL

(71) Applicant: NETFLIX, INC., Los Gatos, CA (US)

(72) Inventors: Christopher Newton, Westlake Village, CA (US); Carenina Garcia Motion, San Jose, CA (US); Vinod Vishwanathan, San Ramon, CA (US)

(73) Assignee: NETFLIX, INC., Los Gatos, CA (US)

( \* ) Notice: Subject to any disclaimer, the term of this patent is extended or adjusted under 35 U.S.C. 154(b) by 16 days.

This patent is subject to a terminal disclaimer.

(21) Appl. No.: 17/930,295

(22) Filed: Sep. 7, 2022

(65) Prior Publication Data

US 2023/0007322 A1 Jan. 5, 2023

Related U.S. Application Data

(63) Continuation of application No. 17/175,338, filed on Feb. 12, 2021, now Pat. No. 11,463,746.

(51) Int. Cl.
*H04N 21/2343* (2011.01)
*H04N 21/239* (2011.01)
(Continued)

(52) U.S. Cl.
CPC ... *H04N 21/23439* (2013.01); *H04N 21/2393* (2013.01); *H04N 21/437* (2013.01); *H04N 21/8456* (2013.01)

(58) Field of Classification Search
None
See application file for complete search history.

(56) References Cited

U.S. PATENT DOCUMENTS

| 5,719,983 A | 2/1998 | Henderson et al. |
| 8,763,053 B1 | 6/2014 | Goode et al. |
| (Continued) | | |

FOREIGN PATENT DOCUMENTS

| EP | 3703384 A1 \* | 9/2020 | ........... H04L 65/602 |
| JP | 2004-328450 A | 11/2004 | |
| (Continued) | | | |

OTHER PUBLICATIONS

Vetro, Anthony, "The MPEG-DASH Standard for Multimedia Streaming Over the Internet", URL:http://ieeexplore.ieee.org/ielx5/93/6077856/06077864.pdf?tp=&amumber=6077864&isnumber=6077856, IEEE, Nov. 15, 2011, pp. 62-67.

*Primary Examiner* — James R Marandi
(74) *Attorney, Agent, or Firm* — Artegis Law Group, LLP

(57) ABSTRACT

One embodiment sets forth a technique that includes receiving a request for a range of data included in an encoded version of the media title that is stored across a set of files. The technique also includes determining, based on a file extent index, one or more files included in the set of files, wherein the file extent index maps an identifier for each file in the set to a given range of data that is stored in the file and included in the encoded version. The technique further includes retrieving the range of data from the file(s), wherein at least a portion of the retrieved range of data falls within the given range of data that is stored in each of the one or more files, and transmitting the range of data in a response to the request.

23 Claims, 7 Drawing Sheets

(51) Int. Cl.
*H04N 21/437* (2011.01)
*H04N 21/845* (2011.01)

(56) References Cited

U.S. PATENT DOCUMENTS

| | | |
|---|---|---|
| 10,033,787 B2 | 7/2018 | Ronca et al. |
| 2007/0005627 A1* | 1/2007 | Dodge .................. G06F 16/50 |
| 2015/0100702 A1 | 4/2015 | Krishna et al. |
| 2018/0035176 A1 | 2/2018 | Stockhammer |
| 2020/0329284 A1* | 10/2020 | Denoual ............... H04L 69/321 |

FOREIGN PATENT DOCUMENTS

| | | |
|---|---|---|
| JP | 2011-019230 A | 1/2011 |
| JP | 2016-538752 A | 12/2016 |
| WO | 2017/140939 A1 | 8/2017 |

\* cited by examiner

TECHNIQUES FOR COMPOSITE MEDIA STORAGE AND RETRIEVAL

CROSS-REFERENCE TO RELATED APPLICATIONS

This application is a continuation of the co-pending U.S. patent application titled, "TECHNIQUES FOR COMPOSITE MEDIA STORAGE AND RETRIEVAL," filed on Feb. 12, 2021 and having Ser. No. 17/175,338. The subject matter of the related application is hereby incorporated herein by reference.

BACKGROUND

Field of the Various Embodiments

Embodiments of the present disclosure relate generally to computer science and computer networks for streaming media, and more specifically, to techniques for composite media storage and retrieval.

DESCRIPTION OF THE RELATED ART

A video streaming service is typically designed to provide users with access to one or more libraries of various media titles. To access a given media title, a user usually connects to the video streaming service via an endpoint device, such as a laptop computer, smart television, tablet computer, or similar device. The user can then select the given media title via a graphical user interface (GUI) that is displayed on the endpoint device and configured to allow users to make selections from one or more libraries of media titles. Upon selecting the given media title, the server machines that host the media title stream media content associated with the media title to the endpoint device. The media content generally includes frames of video, subtitle, and/or audio data encoded with specific bitrates, encoding formats, and/or other encoding settings. These encoding settings may additionally be varied in the streamed media content based on network conditions, user preferences, and/or other parameters. A streaming application executing on the endpoint device can request these frames as ranges of byte and/or time offsets from the server machines. While a given range of media content in the media title is played on the endpoint device, the streaming application can request and receive the next range of media content from the server machines to allow playback of the media title to proceed without interruption.

In various streaming service implementations, different versions of a given media title oftentimes are streamed to different endpoint devices to accommodate content differences that exist in a given scene or other portion of the media title. For example, a feature-length film could include a number of scenes with on-screen text that provides information about the characters in the film, messages sent or received by various characters, content viewed by a given character on a computer or mobile device, or additional context for viewers of the film. Such on-screen text typically would be shown in the language spoken by the characters in the film and would be "burned" into the film (instead of being included in subtitles) to allow the production team to control the placement, font, size, and overall "look" of the text within the film. In such a scenario, each language into which the film is dubbed would require a different set of these particular scenes with localized on-screen text, thereby resulting in different versions of the film.

Some legacy streaming applications are able to retrieve and playback only a single version of a media title from start to finish, instead of switching between versions at certain points during playback of a given media title. Continuing with the above example, a legacy streaming application could switch between files within an adaptive bitrate (ABR) ladder for a "playback title" representing a language-specific version of the film, but would not be able to switch between a first playback title that includes non-localized video content in the film and a second playback title that includes localized versions of a subset of video content in the film unless a user stopped playback of the film, manually changed the language setting for the film within the legacy streaming application, and subsequently resumed playback of the film with the new language setting.

To accommodate these types of legacy streaming applications, a video streaming service may serve each version of a given media title using a separate file, which includes all of the video content required for complete playback of that version of the media title. Continuing with the above example, a feature-length film could include twenty scenes (or portions of scenes) with localized on-screen text, which could take up less than ten minutes of screen time out of a total runtime of more than three hours. The film also could have thirty localized versions of these scenes (or portions of scenes) to handle on-screen text in thirty different languages across all encoding bitrates and formats. Each set of localized scenes for a given language could then be packaged with the non-localized scenes in the film to produce a single localized file for a given combination of language, encoding bitrate, and encoding format that can be retrieved and played end-to-end using a legacy streaming application.

One drawback of the above approach, however, is that storing full copies of individual versions of media titles to accommodate requests from legacy streaming applications involves duplicating video content that is common to multiple versions of the media title, which can consume substantial computational and storage resources. Continuing with the above example, the non-localized scenes in a feature-length film could consume 400 gigabytes (GB) of space across the set of encoding bitrates and formats, while a given set of localized scenes (or portions of scenes) needed across all of these encoding bitrates and formats could consume less than a few GB of space. Using the above approach, the small number of localized scenes specific to a given localized version of the film would be encoded and packaged with the non-localized video content into each video file. For thirty different languages, as in the above example, more than twelve terabytes (TB) of video content would have to be encoded and stored on various server machines to support all thirty localized versions of the film, even though the vast majority of the video content would be identical across the different localized versions.

As the foregoing illustrates, what is needed in the art are more effective techniques for storing and retrieving video content for streaming to endpoint devices.

SUMMARY

One embodiment sets forth a technique for accessing a media title for playback. The technique includes receiving from a client device a first request for a first range of data included in a first encoded version of the media title, wherein the first encoded version of the media title is stored across a first set of files. The technique also includes determining, based on a first file extent index, one or more files that are included in the first set of files and from which the first range of data is to be accessed, wherein, for each file included in the first set of files, the first file extent index maps an identifier for the file to a given range of data that is stored in the file and that is included in the first encoded version of the media title. The technique further includes retrieving the first range of data from the one or more files, wherein at least a portion of the first range of data retrieved from each of the one or more files falls within the given range of data that is stored in the file. The technique further includes transmitting the first range of data to the client device in a response to the first request.

One technical advantage of the disclosed techniques relative to the prior art is that, with the disclosed techniques, duplication of video content across multiple versions of a media title is reduced. In that regard, the disclosed techniques enable a single copy of video content that is common to all versions of a given film to be stored, instead of replicating identical video content across multiple files. Thus, with the disclosed techniques, fewer computational and storage resources are consumed when encoding and storing multiple versions of a media title for streaming. Another technical advantage of the disclosed techniques relative to the prior art is that the disclosed techniques allow a given version of the media title to be created or modified in an efficient, modular manner, unlike prior art approaches that encode and package a given version of a media title from beginning to end. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
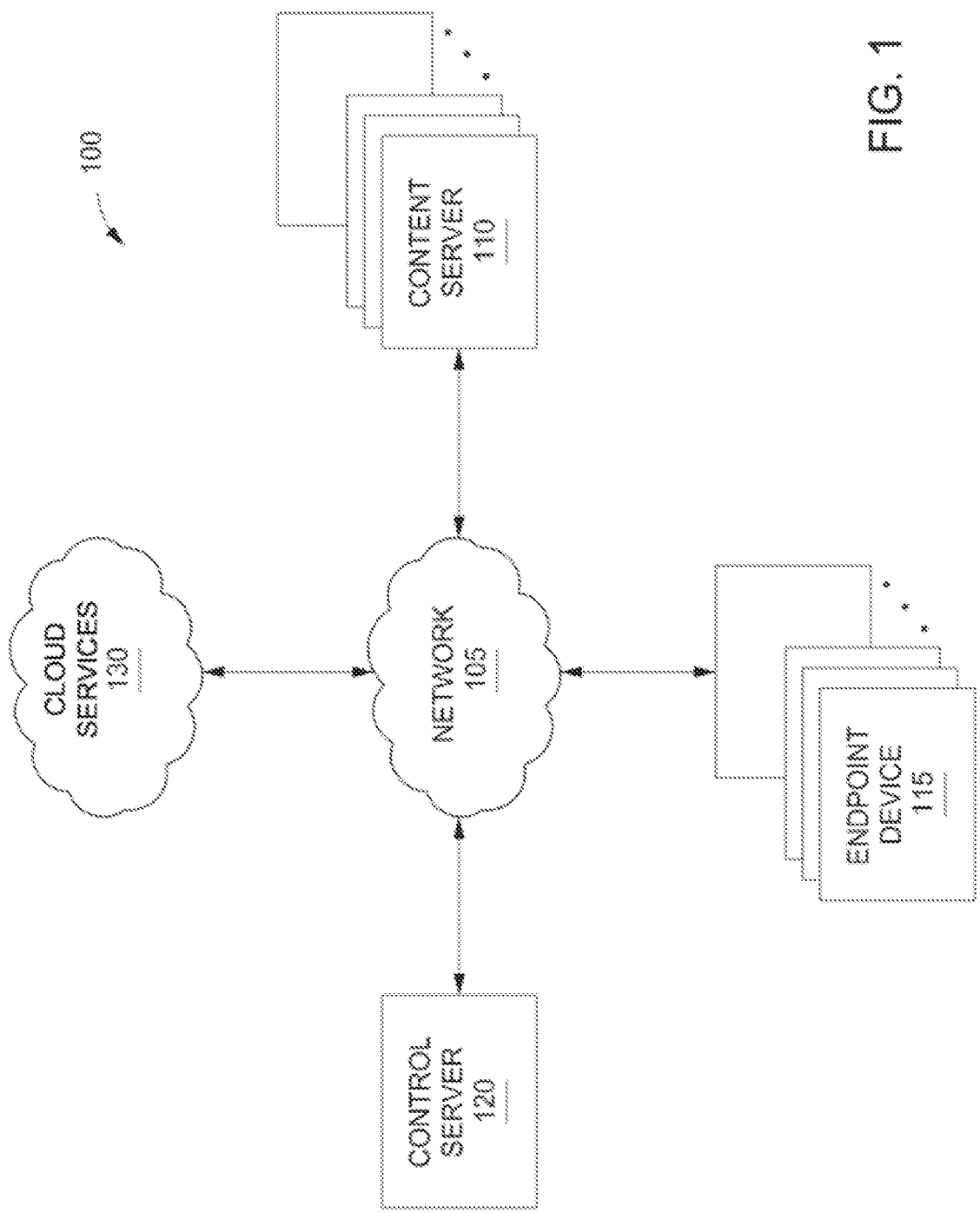
FIG. 1 illustrates a network infrastructure configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A video streaming service delivers high-quality digital video content, such as movies and television shows, to viewers. To support legacy video streaming applications that play streaming content from beginning to end within a single video, different versions of a given media title can be stored in their entirety within different files. Each file can include a portion of video content that is specific to the corresponding version of the media title, as well as a (usually much larger) portion of video content that is the same across multiple versions of the media title. As described herein, a "file" includes video content encoded at different bitrates to support adaptive bitrate (ABR) streaming of the corresponding version of the media title. A legacy streaming application then plays a version of the media title by continuously requesting contiguous ranges of byte and/or time offsets from the video streaming service starting at the beginning of the corresponding file, playing the requested ranges of content in the order in which the ranges were received, and discontinuing playback when the end of the file is reached.

For example, a video streaming service could offer 30 different localized versions of a feature length film. Each version of the feature length film could be dubbed with a corresponding language and include one or more scenes with on-screen text in that language. This on-screen text could provide information about the characters in the film, messages sent or received by various characters, content viewed by a given character on a computer or mobile device, or additional context for viewers of the film. Such on-screen text typically would be shown in the language spoken by the characters in the film and would be "burned" into the film (instead of being included in subtitles) to allow the production team to control the placement, font, size, and overall "look" of the text within the film. The localized scenes with on-screen text would traditionally be packaged with remaining scenes in the film to produce a single localized file for each localized version, which can be retrieved and played end-to-end on a legacy streaming video application. A server that delivers the film in multiple languages to client devices would therefore store multiple files that could occupy multiple TB of storage, even though the vast majority of the video content in the files is the same.

To reduce resource overhead associated with encoding and storing duplicated content in different versions of a media title, the disclosed techniques store content related to multiple versions of the media title in one or more "component" files and/or segments within each file. These files include a single copy of each version of a scene (or another portion of video content) in the media title instead of replicating identical video content across multiple files. For example, a "base" version of a film that includes video content in the original language of the film could be stored in a single file. Localized versions of scenes (or other portions of video content) in the film could then be stored in multiple other files, where each file includes one or more data segments that store localized video content for a corresponding localized version of the film and each data segment includes a "component" of the localized video content (e.g., a consecutive number of seconds or minutes of video in the film). In another example, a single file could store the "base" version of the film as well as all localized versions of video content in the film. In a third example, a first file could store the "base" version of the film, and a second file could store all localized versions of video content in the film.

The disclosed techniques also use a number of index structures with the files or segments to process requests from streaming video applications for content from the media title. The index structures include a number of file mappings that map identifiers for files that store video content for the media title to paths that can be used to locate the files in a filesystem. The index structures also include a file extent index that is used to retrieve video content for a given version of the media title when the video content is stored across multiple files and/or multiple non-contiguous segments within the same file. The file extent index includes an identifier for the corresponding version of the media title, metadata related to the version, and identifiers for files storing video content that is included in the version. Within the file extent index, each identifier for a file is mapped to a range of offsets in the file. The range of offsets represents a portion of video content that is to be retrieved from the file during playback of the version. The ordering of mappings between file identifiers and the corresponding ranges of offsets in the file extent index additionally reflects the order in which video content should be retrieved for end-to-end playback of the version of the media title.

For example, the file extent index for a French version of a film could include a first identifier for the French version followed by three mappings. The mappings include a first mapping between a second identifier for an English "base" version of the film and a first range of byte offsets in a first file that includes the base version, followed by a second mapping between a third identifier for a second file that includes French versions of one or more scenes in the film and a second range of byte offsets in the second file, followed by a third mapping between the second identifier and a third range of byte offsets in the first file. During end-to-end playback of the French version of the film, a legacy streaming video application would request consecutive ranges of bytes of video content from a virtual "file" represented by the first identifier for the French version. A server would process the requests by matching the first identifier to the file extent index and using the mappings in the file extent to return data from the first range of byte offsets in the first file, followed by data from the second range of byte offsets in the second file, followed by data from the third range of byte offsets in the first file. In other words, the server would use the file extent index to piece together different ranges of data from multiple files and return the data in response to the requests, so that the data appears to be read in contiguous "chunks" from the same file from the perspective of the legacy streaming video application.

The index structures further include a segment index that converts time offsets into byte offsets within a given file. This segment index can be used to process requests for video content that is specified in terms of time offset ranges (instead of byte offset ranges). These types of requests can be issued by a streaming video application to perform a "scrub" or "seek" operation that changes the point in time at which the media title is played.

In some embodiments, the index structures can be used to efficiently create a new version of the media title and/or modify an existing version of the media title. For example, a new version of a film could be added to a video streaming service by populating one or more new files with video content that is specific to the new version, mapping an identifier for each new file to the path for the new file, and creating a new file extent index that includes mappings to byte ranges spanned by the video content in the new file(s) and additional mappings to byte ranges spanned by video content in one or more other files that include a "base" version of the film. The new file extent index could include a first mapping of a first file identifier to a first range of data spanned by a replacement version of a scene in the new version of the film instead of a second mapping of a second file identifier to a second range of data spanned by an original version of the scene from the "base" version of the film. During playback of the new version on an endpoint device, a server would process requests for ranges of content in the new version from the endpoint device using the new file extent index. Because the new file extent index causes the server to return data from the replacement version of the scene instead of from the original version of the scene, the new file(s) and new file extent index allow the original version of the scene to be substituted with the replacement version.

One technical advantage of the disclosed techniques relative to the prior art is that, with the disclosed techniques, duplication of video content across multiple versions of a media title is reduced. In that regard, the disclosed techniques enable a single copy of video content that is common to all versions of a given film to be stored, instead of replicating identical video content across multiple files. Thus, with the disclosed techniques, fewer computational and storage resources are consumed when encoding and storing multiple versions of a media title for streaming. Another technical advantage of the disclosed techniques relative to the prior art is that the disclosed techniques allow a given version of the media title to be created or modified in an efficient, modular manner, unlike prior art approaches that encode and package a given version of a media title from beginning to end. These technical advantages provide one or more technological advancements over prior art approaches.

System Overview

FIG. 1 illustrates a network infrastructure configured to implement one or more aspects of the various embodiments. As shown, network infrastructure 100 includes one or more content servers 110, a control server 120, and one or more endpoint devices 115, which are connected to one another and/or one or more cloud services 130 via a communications network 105. Network infrastructure 100 is generally used to distribute content to content servers 110 and endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Network 105 includes any technically feasible wired, optical, wireless, or hybrid network that transmits data between or among content servers 110, control server 120, endpoint device 115, cloud services 130, and/or other components. For example, network 105 could include a wide area network (WAN), local area network (LAN), personal area network (PAN), WiFi network, cellular network, Ethernet network, Bluetooth network, universal serial bus (USB) network, satellite network, and/or the Internet.

Each content server 110 may include one or more applications configured to communicate with control server 120 to determine the location and availability of various files that are tracked and managed by control server 120. Each content server 110 may further communicate with cloud services 130 and one or more other content servers 110 to "fill" each content server 110 with copies of various files. In addition, content servers 110 may respond to requests for files received from endpoint devices 115. The files may then be distributed from content server 110 or via a broader content distribution network. In some embodiments, content servers 110 may require users to authenticate (e.g., using a username and password) before accessing files stored on content servers 110. Although only a single control server 120 is shown in FIG. 1, in various embodiments multiple control servers 120 may be implemented to track and manage files.

In various embodiments, cloud services 130 may include an online storage service (e.g., Amazon® Simple Storage Service, Google® Cloud Storage, etc.) in which a catalog of files, including thousands or millions of files, is stored and accessed in order to fill content servers 110. Cloud services 130 also may provide compute or other processing services. Although only a single instance of cloud services 130 is shown in FIG. 1, in various embodiments multiple cloud services 130 and/or cloud service instances may be implemented.

Figure 2:
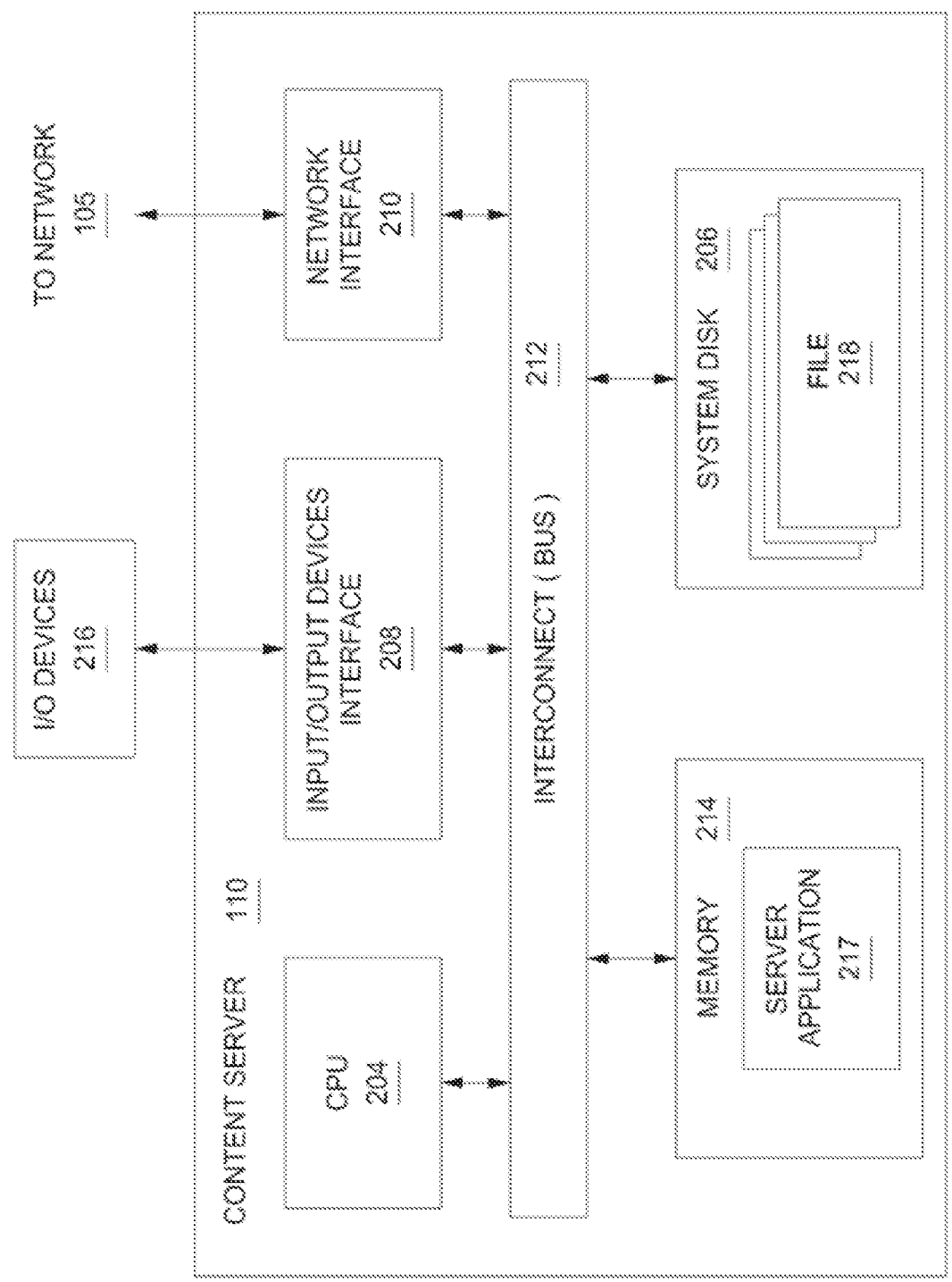
FIG. 2 is a block diagram of a content server that may be implemented in conjunction with the network infrastructure of FIG. 1, according to various embodiments.

FIG. 2 is a block diagram of content server 110 that may be implemented in conjunction with the network infrastructure of FIG. 1, according to various embodiments. As shown, content server 110 includes, without limitation, a central processing unit (CPU) 204, a system disk 206, an input/output (I/O) devices interface 208, a network interface 210, an interconnect 212, and a system memory 214.

CPU 204 is configured to retrieve and execute programming instructions, such as a server application 217, stored in system memory 214. Similarly, CPU 204 is configured to store application data (e.g., software libraries) and retrieve application data from system memory 214. Interconnect 212 is configured to facilitate transmission of data, such as programming instructions and application data, between CPU 204, system disk 206, I/O devices interface 208, network interface 210, and system memory 214. I/O devices interface 208 is configured to receive input data from I/O devices 216 and transmit the input data to CPU 204 via interconnect 212. For example, I/O devices 216 may include one or more buttons, a keyboard, a mouse, and/or other input devices. I/O devices interface 208 is further configured to receive output data from CPU 204 via interconnect 212 and transmit the output data to I/O devices 216.

System disk 206 may include one or more hard disk drives, solid state storage devices, or similar storage devices. System disk 206 is configured to store non-volatile data such as files 218 (e.g., audio files, video files, subtitle files, application files, software libraries, etc.). Files 218 can then be retrieved by one or more endpoint devices 115 via network 105. In some embodiments, network interface 210 is configured to operate in compliance with the Ethernet standard.

System memory 214 includes server application 217, which is configured to service requests received from endpoint device 115 and other content servers 110 for one or more files 218. When server application 217 receives a request for a given file 218, server application 217 retrieves the requested file 218 from system disk 206 and transmits file 218 to an endpoint device 115 or a content server 110 via network 105. Files 218 include digital content items such as video files, audio files, and/or still images. In addition, files 218 may include metadata associated with such content items, user/subscriber data, etc. Files 218 that include visual content item metadata and/or user/subscriber data may be employed to facilitate the overall functionality of network infrastructure 100. In alternative embodiments, some or all of files 218 may instead be stored in a control server 120, or in any other technically feasible location within network infrastructure 100.

In one or more embodiments, server application 217 includes functionality to store video content that is unique to different versions of a media title in multiple byte ranges within one or more files 218. Server application 217 also uses a number of index structures and mappings to retrieve the byte ranges in a particular order for each version of the media title during playback of the version on one or more endpoint devices 115. As described in further detail with respect to FIGS. 5-7, this technique for storing and retrieving content allows server application 217 to minimize duplication of content in files 218. This technique further allows server application 217 to return, in response to each request from endpoint devices 115 for content from a given version of the media title, data that appears to be read in contiguous "chunks" from the same file, even when the data is stored across multiple files 218.

Figure 3:
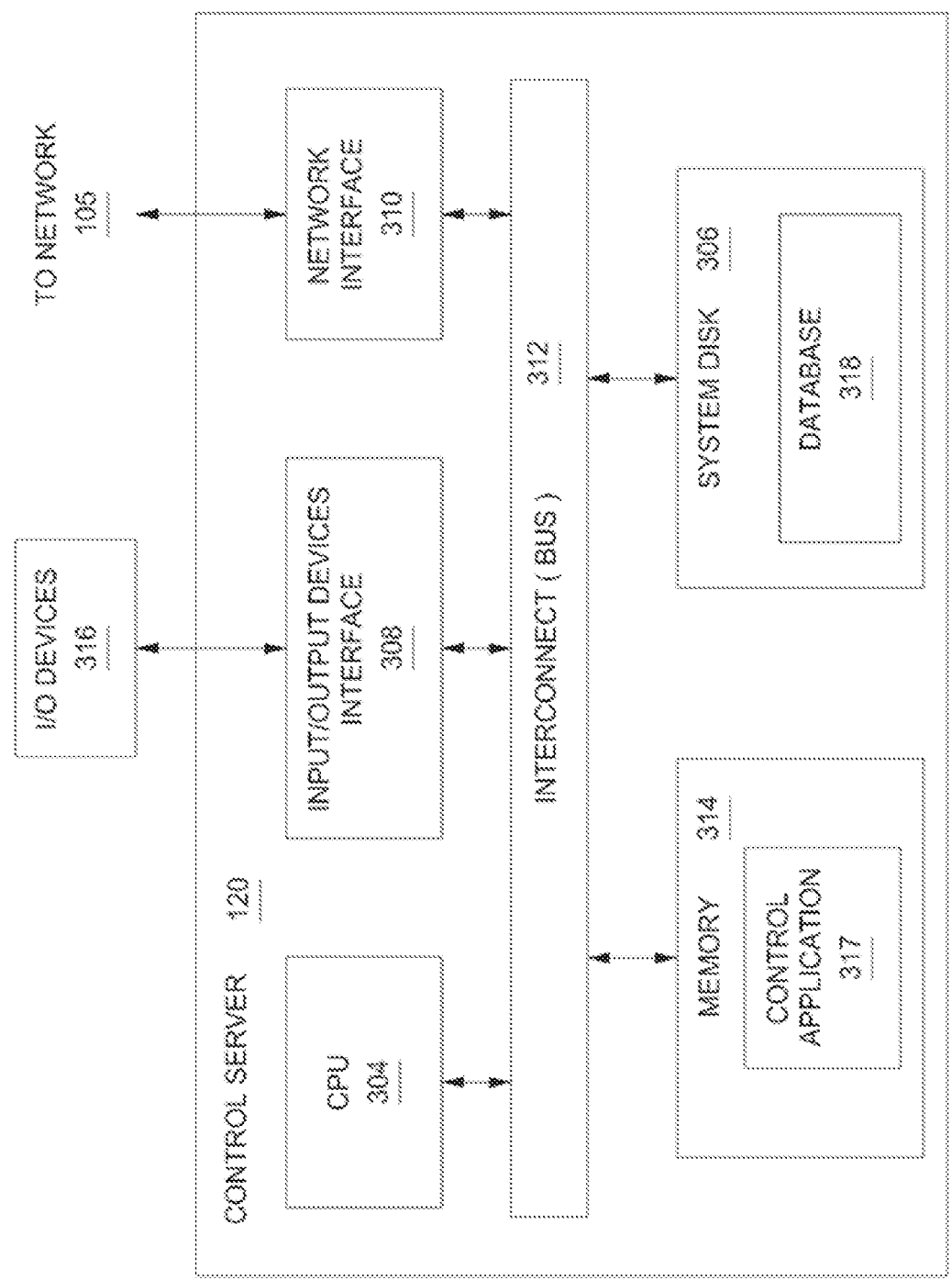
FIG. 3 is a block diagram of a control server that may be implemented in conjunction with the network infrastructure of FIG. 1, according to various embodiments.

FIG. 3 is a block diagram of control server 120 that may be implemented in conjunction with the network infrastructure 100 of FIG. 1, according to various embodiments. As shown, control server 120 includes, without limitation, a central processing unit (CPU) 304, a system disk 306, an input/output (I/O) devices interface 308, a network interface 310, an interconnect 312, and a system memory 314.

CPU 304 is configured to retrieve and execute programming instructions, such as control application 317, stored in system memory 314. Similarly, CPU 304 is configured to store application data (e.g., software libraries) and retrieve application data from system memory 314 and a database 318 stored in system disk 306. Interconnect 312 is configured to facilitate transmission of data between CPU 304, system disk 306, I/O devices interface 308, network interface 310, and system memory 314. I/O devices interface 308 is configured to transmit input data and output data between I/O devices 316 and CPU 304 via interconnect 312. System disk 306 may include one or more hard disk drives, solid state storage devices, and the like. System disk 306 is configured to store a database 318 of information associated with content servers 110, cloud services 130, and files 218.

System memory 314 includes a control application 317 configured to access information stored in database 318 and process the information to determine the manner in which specific files 218 will be replicated across content servers 110 included in the network infrastructure 100. Control application 317 may further be configured to receive and analyze performance characteristics associated with one or more of content servers 110 and/or endpoint devices 115. As noted above, in some embodiments, metadata associated with such visual content items, and/or user/subscriber data may be stored in database 318 rather than in files 218 stored in content servers 110.

Figure 4:
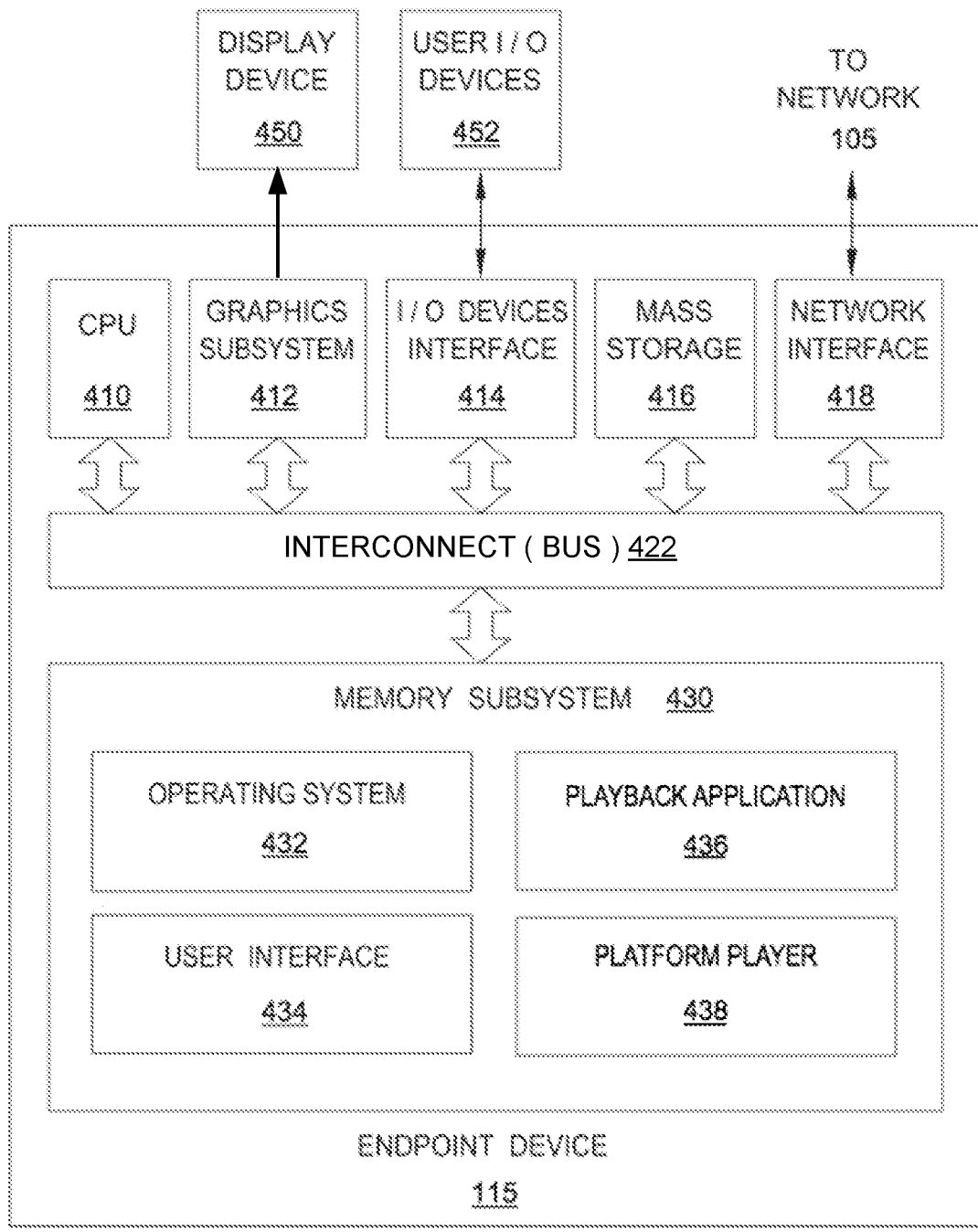
FIG. 4 is a block diagram of an endpoint device that may be implemented in conjunction with the network infrastructure of FIG. 1, according to various embodiments.

FIG. 4 is a block diagram of endpoint device 115 that may be implemented in conjunction with the network infrastructure of FIG. 1, according to various embodiments. As shown, endpoint device 115 may include, without limitation, a CPU 410, a graphics subsystem 412, an I/O devices interface 414, a mass storage unit 416, a network interface 418, an interconnect 422, and a memory subsystem 430.

In some embodiments, CPU 410 is configured to retrieve and execute programming instructions stored in memory subsystem 430. Similarly, CPU 410 is configured to store and retrieve application data (e.g., software libraries) residing in memory subsystem 430. Interconnect 422 is configured to facilitate transmission of data, such as programming instructions and application data, between CPU 410, graphics subsystem 412, I/O devices interface 414, mass storage unit 416, network interface 418, and memory subsystem 430.

In some embodiments, graphics subsystem 412 is configured to generate frames of video data and transmit the frames of video data to display device 450. In some embodiments, graphics subsystem 412 may be integrated into an integrated circuit, along with CPU 410. Display device 450 may comprise any technically feasible means for generating an image for display. For example, display device 450 may be fabricated using liquid crystal display (LCD) technology, cathode-ray technology, and light-emitting diode (LED) display technology. I/O devices interface 414 is configured to receive input data from user I/O devices 452 and transmit the input data to CPU 410 via interconnect 422. For example, user I/O devices 452 may include one or more buttons, a keyboard, and/or a mouse or other pointing device. I/O devices interface 414 also includes an audio output unit configured to generate an electrical audio output signal. User I/O devices 452 includes a speaker configured to generate an acoustic output in response to the electrical audio output signal. In alternative embodiments, display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via network 105. In some embodiments, network interface 418 is configured to communicate using the well-known Ethernet standard. Network interface 418 is coupled to CPU 410 via interconnect 422.

In some embodiments, memory subsystem 430 includes programming instructions and application data that include an operating system 432, a user interface 434, a playback application 436, and a platform player 438. Operating system 432 performs system management functions such as managing hardware devices including network interface 418, mass storage unit 416, I/O devices interface 414, and graphics subsystem 412. Operating system 432 also provides process and memory management models for user interface 434, playback application 436, and/or platform player 438. User interface 434, such as a window and object metaphor, provides a mechanism for user interaction with endpoint device 115. Persons skilled in the art will recognize the various operating systems and user interfaces that are well-known in the art and suitable for incorporation into endpoint device 115.

In some embodiments, playback application 436 is configured to request and receive content from content server 110 via network interface 418. Further, playback application 436 is configured to interpret the content and present the content via display device 450 and/or user I/O devices 452. In so doing, playback application 436 may generate frames of video data based on the received content and then transmit those frames of video data to platform player 438. In response, platform player 438 causes display device 450 to output the frames of video data for playback of the content on endpoint device 115. In one embodiment, platform player 438 is included in operating system 432.

Composite Media Storage and Retrieval

Figure 5:
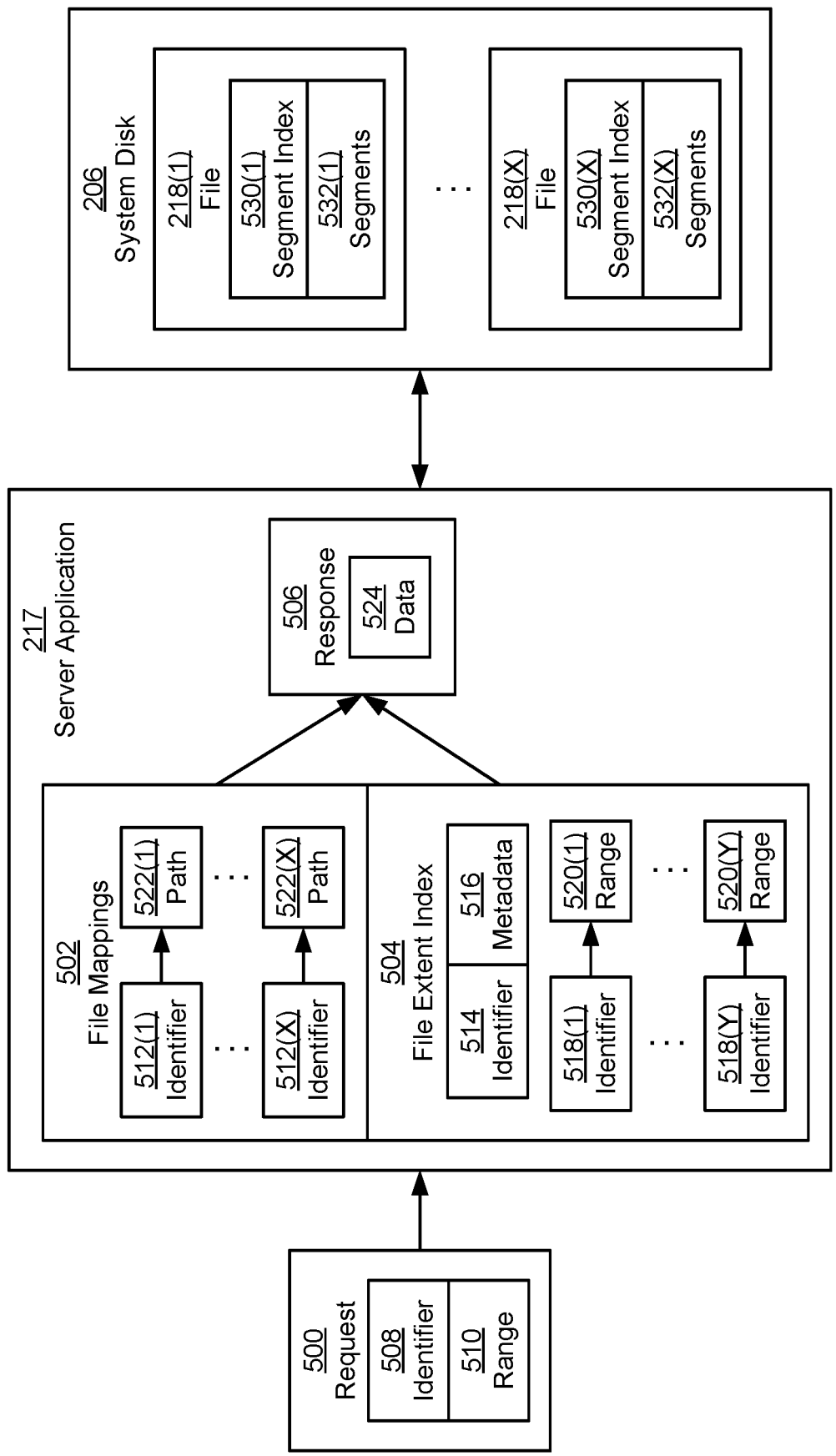
FIG. 5 illustrates how a request for media content is processed by the server application of FIG. 2, according to various embodiments.

FIG. 5 illustrates how a request 500 for media content is processed by server application 217 of FIG. 2, according to various embodiments. As shown, request 500 includes an identifier 508 for a version of a media title and a range 510 of data to retrieve from the version. For example, identifier 508 could include a title, filename, numeric identifier, and/or another value that uniquely identifies the version. Range 510 could include a range of byte offsets, time offsets, and/or other types of offsets in the version.

As mentioned above, each version of the media title may include a subset of video content that is specific to the version, while a majority of video content in the media title may be common to multiple versions of the media title. For example, the media title could include a number of different localized versions to support playback in multiple languages. Each localized version of the media title could include audio content in a corresponding language, as well as one or more scenes of video content that show onscreen text, graphics, and/or other types of localization in the same language. In another example, the media title could include different versions of scenes with sensitive content to meet criteria for different television, film, or content ratings for a given country.

Server application 217 uses one or more file mappings 502 and/or a file extent index 504 to process request 500. File mappings 502 and/or file extent index 504 may be stored in a relational database, key-value store, distributed filesystem, one or more flat files, and/or another type of data store or format.

File mappings 502 include identifiers 512(1)-512(X) for different versions of the media title. Each of identifiers 512(1)-512(X) is referred to individually as identifier 512. For example, each identifier 512 could include a title, filename, numeric identifier, and/or another value that uniquely identifies the corresponding version of the media title.

File mappings 502 also include paths 522(1)-522(X) for files 218(1)-218(X) on system disk 206. Each of paths 522(1)-522(X) is referred to individually as path 522, and each of files 218(1)-218(X) is referred to individually as file 218.

More specifically, each of file mappings 502 includes a one-to-one mapping between a given identifier 512 for a version of the media title and a path 522 for a corresponding file 218 that stores video (or another type of) content for the media title. Within each file mapping 502, identifier 512 acts as a key that can be used to retrieve path 522 for a corresponding file 218.

In one or more embodiments, server application 217 processes request 500 by performing a lookup of file mappings 502 using identifier 508. When identifier 508 matches a given identifier 512 in file mappings 502, server application 217 retrieves the requested range 510 of data from a particular file 218 at the corresponding path 522 to which the given identifier 512 is mapped. For example, server application 217 could match a value of "111222333" for identifier 508 to the following mapping included in file mappings 502:
    111222333/1/01/111222333.ismv
Server application 217 would retrieve a value of "/1/01/111222333.ismv" for path 522 from the mapping and read data 524 that spans a byte range 510 (e.g., range of byte offsets) specified in request 500 from the corresponding file 218 at path 522. Server application 217 would then return the retrieved data 524 in a response 506 to request 500, thereby allowing the device (e.g., endpoint device 115) from which request 500 was received to start or continue playback of the version of the media title stored in the "111222333" file 218.

Unlike file mappings 502, file extent index 504 includes data that can be used to perform streaming or playback of a corresponding version of the media title from multiple files (or multiple non-contiguous segments within the same file). For example, file extent index 504 could be created for a version of the media title that includes alternative or additional scenes, which are substituted for or added to original versions of the scenes in a "base" version of the media title. In this example, the alternative or additional scenes could be stored in one or more files, and scenes from the base version of the media title could be stored in one or more other files.

As shown, file extent index 504 includes an identifier 514 (e.g., a unique name or alphanumeric identifier) for the version of the media title, metadata 516 related to the version, and mappings of identifiers 518(1)-518(Y) for one or more files 218 to ranges 520(1)-520(Y) of data to be retrieved from the file(s) (e.g., a range denoted by a starting byte offset and an ending byte offset, a range denoted by a starting byte offset and an end represented by a number of bytes after the starting byte offset, etc.). Each of identifiers 518(1)-518(Y) is referred to individually as identifier 518, and each of ranges 520(1)-520(Y) is referred to individually as range 520. The ordering of mappings between identifiers 518(1)-518(Y) and the corresponding ranges 520(1)-520(Y) in file extent index 504 additionally reflects the order in which video content should be retrieved for end-to-end playback of the version of the media title.

An example file extent index 504 includes the following representation:

111222111 1593204284, 46828784, ismv; 111222333:0: 20000;
   111222444:5000:46808784

The above representation includes a value of "111222111" for identifier 514, followed by three metadata 516 values. The first value of "1593204284" represents the modification time for the corresponding version of the media title, the second value of "46828784" represents the length in bytes of the version, and the third value of "ismv" represents a filename extension that can be used to construct a Hypertext Transfer Protocol (HTTP) response 506 header. Metadata 516 values are followed by two mappings of identifiers 518 to ranges 520. The first mapping includes a value of "111222333" for identifier 518, a beginning byte offset of 0 in the corresponding range 520, and a value of "20000" for the number of bytes spanned by the corresponding range 520. The second mapping includes a value of "111222444" for identifier 518, a beginning byte offset of "5000" in the corresponding range 520, and a value of "46808784" for the number of bytes spanned by the corresponding range 520. This example file extent index 504 indicates that the first 20,000 bytes of the "111222111" version of the media title are retrieved from the first 20,000 bytes of the file mapped to the "111222333" identifier in file mappings 502, and that the remaining 46,808,784 bytes of the "111222111" version are retrieved starting at the 5,000$^{th}$ byte of the file mapped to the "111222444" identifier in file mappings 502.

When identifier 508 in request 500 does not match any identifier 512 in file mappings 502, server application 217 may match identifier 508 to identifier 514 in a given file extent index 504. For example, server application 217 could perform a lookup of a database, key-value store, and/or another data store to retrieve a given file extent index 504 with a value of identifier 514 that matches the value of identifier 508 in request 500. This lookup could be performed in conjunction with or independent of a lookup of file mappings 502 using the same identifier 508.

After identifier 508 is matched to identifier 514 in file extent index 504, server application 217 uses mappings between one or more identifiers 518 to one or more ranges 520 in file extent index 504 and corresponding file mappings 502 between the same identifiers 512 and the corresponding paths 522 to retrieve data 524 in the requested range 510. In other words, server application 217 uses file extent index 504 and file mappings 502 to piece together different ranges of data 524 from multiple files 218 and return data 524 in response 506 so that, to the device from which request 500 was received, the returned data 524 appears to be read in a contiguous range from the same file.

The operation of server application 217 is illustrated using a value of "111222111" for identifier 508 in request 500, the above example file extent index 504, the above example file mapping of "111222333/1/01/111222333.ismv," and an additional file mapping of "111222444/1/01/111222444.ismv." First, server application 217 matches identifier 508 to the same value of "111222111" for identifier 514 in the example file extent index 504. Next, server application 217 uses mappings of identifiers 518 to ranges 520 in the example file extent index 504 to determine one or more files 218 from which the requested range 510 of data 524 is to be extracted, as well as corresponding portions of data to be extracted from each file. Server application 217 also uses file mappings 502 associated with the file(s) to locate the file(s) on system disk 206, retrieve the corresponding portions of data from the file(s), and return the retrieved data 524 in response 506.

Thus, if range 510 in request 500 includes the first 10,000 bytes of the version of the media title represented by the "111222111" identifier, server application 217 would use the first mapping in the example file extent index 504 to determine that the entire range 510 is to be read from the first 10,000 bytes of the file mapped to the "111222333" identifier 518 in the example file extent index 504. Next, server application 217 would use the file mapping that includes the "111222333" identifier 512 to obtain a path of "/1/01/111222333.ismv" for the corresponding file and retrieve the first 10,000 bytes from the file. Server application 217 would then generate response 506 that includes the retrieved data 524 and transmit response 506 to the device or location from which request 500 was received.

If range 510 in request 500 includes 10,000 bytes starting at the 20,000th byte of the media title represented by the "111222111" identifier, server application 217 would use the first and second mappings in the example file extent index 504 to determine that the entire range 510 is to be read from the file mapped to the "111222444" identifier 518 in the example file extent index 504. Next, server application 217 would use the file mapping that includes the "111222444" identifier to obtain a path of "/1/01/111222444.ismv" for the corresponding file and retrieve 10,000 bytes from the file, starting at byte offset 5,000 in the file.

If range 510 in request 500 includes 10,000 bytes starting at the 100,000th byte of the media title represented by the "111222111" identifier, server application 217 would use the mappings in the example file extent index 504 to determine that the entire range 510 is to be read from the file mapped to the "111222444" identifier 518 in the example file extent index 504. Next, server application 217 would use the file mapping that includes the "111222444" identifier to obtain a path of "/1/01/111222444.ismv" for the corresponding file and retrieve 10,000 bytes from the file, starting at byte offset 85,000 in the file (since the first 20,000 bytes in the media title come from the file mapped to the "111222333" identifier and the starting point for the range from the file mapped to the "111222444" identifier is the 5,000th byte).

In some embodiments, server application 217 uses segment indexes 530(1)-530(X) for one or more files 218(1)-218(X) to process request 500 when range 510 is specified in time offsets instead of byte offsets. For example, request 500 could include time offsets in range 510 when request 500 is used to "seek" or "scrub" to a different part of the media title during playback. Request 500 could also, or instead, include time offsets in range 510 when request 500 is received from a given playback application 436 that performs retrieval and playback of streaming content using time offsets instead of byte offsets. Each of segment indexes 530(1)-530(X) is referred to individually as segment index 530 and includes a mapping of time offsets (e.g., timestamps) to byte offsets in individual segments 532(1)-532(X) within the corresponding file 218. Each segment index 530 may be stored at the beginning of the corresponding file 218 and/or in a separate file or location.

More specifically, when request 500 includes a range 510 of time offsets, server application 217 may match identifier 508 to a corresponding identifier 512 in file mappings 502 and/or identifier 514 in file extent index 504. If identifier 508 is the same as a given identifier 512 in file mappings 502, server application 217 retrieves segment index 530 from file 218 at a corresponding path 522 to which the given identifier 512 is mapped. Server application 217 also uses mappings between time offsets and byte offsets in the retrieved segment index 530 to convert the time offsets in range 510 into byte offsets in file 218. Server application 217 then retrieves data 524 spanning the byte offsets from file 218 and return data 524 in response 506 to request 500.

If identifier 508 matches identifier 514 in file extent index 504, server application 217 uses file extent index 504 and one or more segment indexes 530 for one or more files 218 represented by one or more identifiers 518 in file extent index 504 to process request 500. In particular, server application 217 uses segment indexes 530 to convert ranges 520 of byte offsets in file extent index 504 into ranges of time offsets for the corresponding files 218. Server application 217 may optionally store mappings between byte offsets specified in ranges 520 within file extent index 504 and the corresponding time offsets in files 218 in file extent index 504 and/or another index structure. For example, server application 217 could annotate a given range 520 of byte offsets in file extent index 504 with a corresponding range 520 of time offsets in the version of the media title. After request 500 is received, server application 217 may use these ranges 520 of time offsets to identify one or more files 218 from which data spanning range 510 is to be retrieved. Server application 217 may then use segment indexes 530 for these file(s) to convert time offsets in range 510 into one or more ranges of bytes in the file(s), retrieve data 524 spanning the byte range(s) from the file(s), and return the retrieved data 524 in response 506.

The operation of server application 217 is illustrated using the example file extent index 504 and example file mappings 502 above, a value of "111222111" for identifier 508 in request 500, and time offsets of 0:00:00 and 0:00:30 in range 510 within request 500. First, server application 217 matches identifier 508 to the same value of "111222111" for identifier 514 in the example file extent index 504. Server application 217 also retrieves, from file extent index 504 and/or one or more segment indexes 530 for the "111222333" and "111222444" files, mappings that convert the byte range starting at offset 0 and spanning 20,000 bytes for the "111222333" file to time offsets of 00:00:00 to 00:00:30 and the byte range beginning at byte offset 5,000 and spanning 46,808,784 bytes for the "111222444" file to time offsets of 00:00:31 to 03:00:00. Server application 217 then uses file mappings 502 to retrieve the first 20,000 bytes from the "111222333" file and return the retrieved data in response 506 to request 500.

If request 500 includes the same identifier 508 of "111222111" and time offsets of 00:00:00 and 00:01:00 in range 510, server application 217 may use the mappings of byte ranges to time offsets in file extent index 504 and/or one or more segment indexes 530 to determine that range 510 spans both the "111222333" and "111222444" files. Server application 217 may retrieve the entire byte range of 0 to 20,000 from the "111222333" file, since the time offsets spanned by the first 20,000 bytes of the "111222333" file fall within the time offsets in range 510. Server application 217 may also retrieve segment index 530 for the "111222444" file and use one or more mappings in the retrieved segment index 530 to convert the time offset of 00:01:00 from range 510 into a byte offset of 45,000 in the "111222444" file. Server application 217 may then generate response 506 that includes the first 20,000 bytes from the "111222333" file and additional data spanning the byte offsets of 5,000 and 45,000 from the "111222444" file.

Figure 6A:
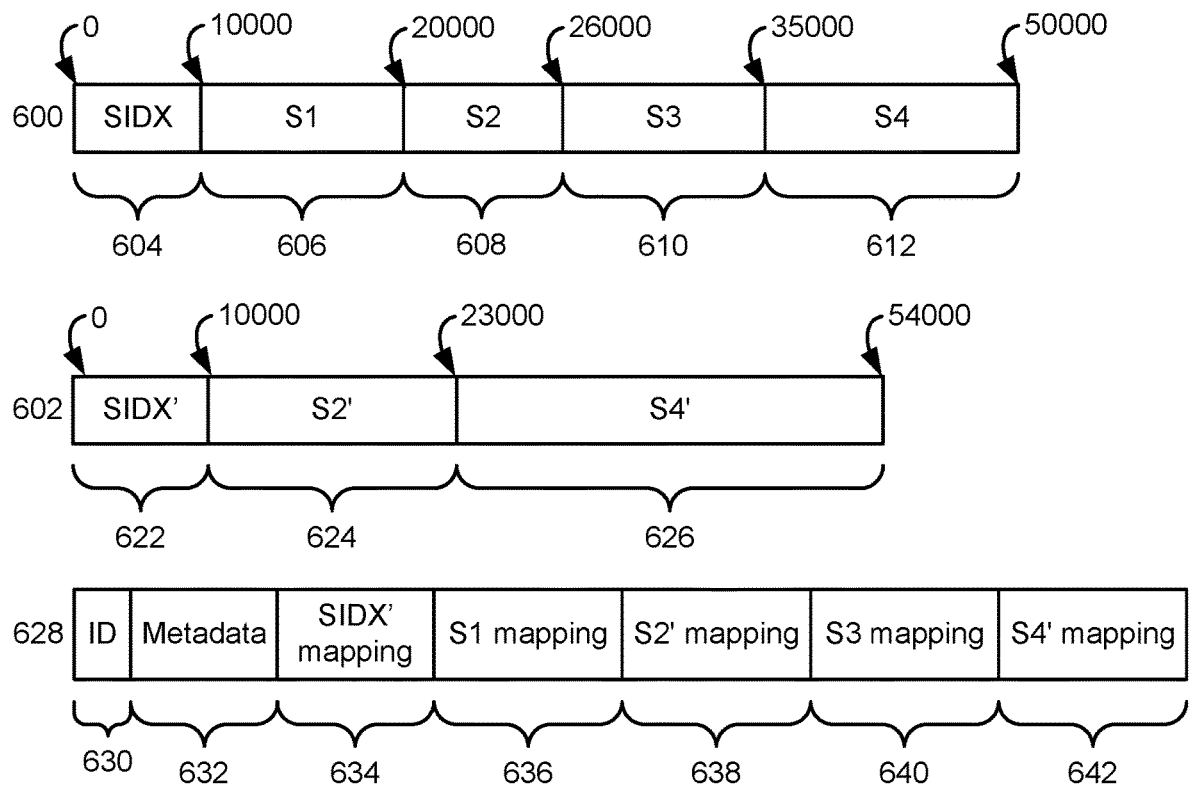
FIG. 6A illustrates an exemplar set of data structures that can be used when playing back a version of a media title, according to various embodiments.

FIG. 6A illustrates an exemplar set of data structures that can be used when playing back a version of a media title, according to various embodiments. As shown, these structures include two files 600-602 and a file extent index 628.

File 600 includes a number of portions 604-612. The first portion 604 stores a segment index (SIDX) that maps time offsets in one or more versions of the media title to byte offsets in file 600, and four subsequent portions 606-612 store four data segments S1, S2, S3, and S4. Data segments S1, S2, S3, and S4 in portions 606-612 include encoded segments of video and/or other content in the version of the media title, which can be partially or wholly retrieved and delivered to playback application 436 on a given endpoint device 115 for playback on the same endpoint device 115.

Like file 600, file 602 includes a number of portions 622-626. The first portion 622 stores a SIDX (denoted as SIDX') that maps time offsets in one or more versions of the media title to byte offsets in file 602, and two subsequent portions 624-626 store two data segments S2' and S4'. S2' includes an alternative version of segment S2, and S4' includes an alternative version of segment S4. For example, segments S2' and S4' could include localized French versions of English-language video content stored in segments S2 and S4, respectively. In another example, segments S2' and S4' could include edited or audience-appropriate versions of original video content stored in segments S2 and S4, respectively.

In some embodiments, SIDX' in portion 622 of file 602 includes mappings of time offsets in one or more versions of the media title to byte offsets in one or more corresponding files 600 and/or 602. These mappings allow the alternative versions of video content in segments S2' and S4' to be overlaid onto "base" or original versions of video content in file 600 during playback of a version of the media title that replaces segments S2 and S4 with segments S2' and S4', respectively. For example, SIDX' in portion 622 could include mappings of time offsets in segment S1 to byte offsets in portion 606, followed by mappings of time offsets in segment S2' to byte offsets in portion 624, followed by mappings of time offsets in segment S3 to byte offsets in portion 610, followed by mappings of time offsets in segment S4' to byte offsets in portion 626.

Because text in different languages can consume different amounts and/or regions of screen space in these scenes, alternative versions of video content stored in S2' and S4' can occupy different amounts of space than the original versions stored in S2 and S4, respectively. In particular, byte offsets denoting the boundaries of portions 604-626 in files 600-602 are shown in FIG. 6A, and ranges of these byte offsets occupied by various portions 604-626 are described below. Each range is represented by a starting byte offset that is included in the range and an ending byte offset to which the range extends but does not include. Thus, an example range spanned by the byte offsets of 5,000 to 10,000 would be interpreted as 5,000 (inclusive) to 10,000 (exclusive).

More specifically, byte offsets occupied by portions 604-626 indicate that the first 10,000 bytes of files 600-602 are reserved for the corresponding portions 604 and 622, which allows SIDX mappings and/or other metadata to be stored in these portions. The byte offsets also indicate that S1 in portion 606 spans the byte offsets of 10,000 to 20,000 in file 600, S2 in portion 608 spans the byte offsets of 20,000 to 26,000 in file 600, S3 in portion 610 spans the byte offsets of 26,000 to 35,000 in file 600, and S4 in portion 612 spans the byte offsets of 35,000 to 50,000 in file 600. The byte offsets further indicate that S2' in portion 624 spans the byte offsets of 10,000 to 23,000 in file 602 and that S4' in portion 626 spans the byte offsets of 23,000 to 54,000 in file 602. As a result, S2' and S4' are about twice the size of S2 and S4, respectively.

In turn, SIDX mappings stored in the SIDX of portion 604 and SIDX' of portion 622 may reflect the different sizes of the corresponding segments. For example, the SIDX in portion 604 could map time offsets of 00:05:00 and 00:07:00 in the media title to the byte offsets of 20,000 and 26,000 spanned by S2 in portion 606, while the SIDX in portion 622 could map the same time offsets of 00:05:00 and 00:07:00 in the media title to the byte offsets of 10,000 and 23,000 spanned by S2' in portion 624.

File extent index 628 includes a number of portions 630-642, which store data that can be used to perform streaming or playback of a version of the media title from multiple files. For example, file extent index 628 could be used to process requests for content in a French version of the media title, which includes a non-localized English version of a first scene stored in S1, a French version of a second scene stored in S2', a non-localized version of a third scene stored in S3, and a French version of a fourth scene stored in S4'. In another example, file extent index 628 could be used to process requests for content in a family-friendly version of the media title, which includes an original version of a first scene stored in S1, an edited version of a second scene stored in S2', an original version of a third scene stored in S3, and an edited version of a fourth scene stored in S4'.

More specifically, file extent index 628 includes a first portion 630 storing a unique identifier for the version of the media title, as well as a second portion 632 that stores metadata (e.g., modification time, length in bytes, filename extension, etc.) related to the version. The remaining five portions 634-642 store mappings that specify different ranges of data to be read during playback of the version. As described above, each mapping in portions 634-642 may include an identifier for a file, as well as a beginning and ending byte and/or time offset for a range of data that is stored in the file and included in the version of the media title. The ordering of the mappings in portions 634-642 additionally indicates the order in which video content should be retrieved for end-to-end playback of the version of the media title. In particular, the mappings in portions 634-642 specify that end-to-end playback of the version of the media title should involve retrieving SIDX' stored in file 602 (e.g., to allow requests for data spanning time offsets in the version of the media title to be processed), followed by retrieving S1 stored in byte offsets 10,000 up to (but not including) 20,000 from file 600, followed by retrieving S2' stored in byte offsets 10,000 up to (but not including) 23,000 from file 602, followed by retrieving S3 stored in byte offsets 26,000 up to (but not including) 35,000 from file 600, and followed by retrieving S4' stored in byte offsets 23,000 up to (but not including) 54,000 from file 602.

Figure 6B:
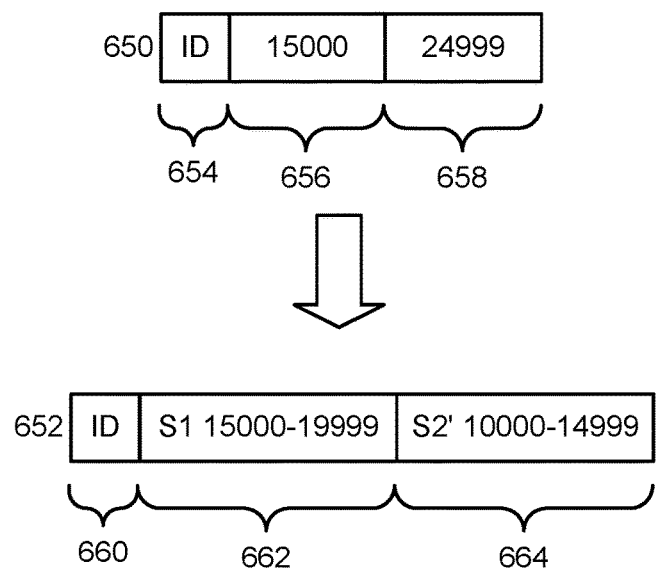
FIG. 6B illustrates how a request for media content is processed using the exemplar set of data structures of FIG. 6A, according to various embodiments.

FIG. 6B illustrates how a request for media content is processed using the exemplar set of data structures of FIG. 6A, according to various embodiments. Request 650 includes a first portion 654 that specifies an identifier for a version of a media title, a second portion 656 that specifies a beginning byte offset of 15,000, and a third portion 658 that specifies an ending byte offset of 24,999.

As shown, request 650 is processed by retrieving data spanning the range represented by the beginning and ending byte offsets in portions 656-658 from the version of the media title. To process request 650, server application 217 matches the ID in portion 654 to the ID in portion 630 of file extent index 628. Next, server application 217 uses file extent index 628 to identify one or more files from which the range of data is to be retrieved, as well as portions of the file(s) corresponding to the range of data.

In particular, server application 217 uses mappings stored in portions 634-642 of file extent index 628 to convert the beginning and ending byte offsets in portions 656-658 of request 650 into offsets within one or more files 600-602. First, server application 217 uses the byte range of 0 to 10,000 spanned by SIDX' in the mapping stored in portion 634 and the byte range of 10,000 to 20,000 spanned by S1 in the mapping stored in portion 636 to determine that the beginning offset of 15,000 in portion 656 of request 650 corresponds to the byte offset of 15,000 in file 600. For example, server application 217 could determine that the 15,000th byte of content in the requested version of the media title lies beyond the 10,000 bytes spanned by SIDX' in the mapping stored in portion 634. Server application 217 could also determine that this 15,000th byte is 5,000 bytes after SIDX' (e.g., by subtracting the 10,000 bytes spanned by SIDX' from the requested byte offset of 15,000) and add 5,000 to the beginning offset of 10,000 for S1 in the mapping stored in portion 636 to obtain an offset of 15,000 in file 600. Since this offset of 15,000 in file 600 falls within the byte range stored in portion 636, server application 217 would retrieve data starting from this offset.

Server application 217 also determines that the ending offset of 24,999 in portion 658 is 10,000 bytes after the starting offset of 15,000 in portion 656, thereby indicating that 10,000 bytes of content in the version of the media title are to be retrieved, starting at the 15,000th byte of content in the version of the media title. Server application 217 then uses mappings in portions 634-642 of file extent index 628 to identify a byte offset in a file that corresponds to 10,000 bytes after the 15,000th byte of content. For example, server application 217 could determine that 5,000 bytes lie between the byte offset of 15,000 in file 600, which represents the 15,000th byte of content in the version of the media title, and the end of the byte range stored in portion 636. Server application 217 would then determine that 5,000 more bytes are to be retrieved from one or more byte ranges stored in subsequent portions 638-642 of file extent index 628 to satisfy request 650. In turn, server application 217 would use the byte range of 10,000-23,000 spanned by S2' in the mapping stored in portion 638 to determine that the requested range ends in S2' within file 602, and that the remaining 5,000 bytes should be retrieved from byte offsets 10,000 to 14,999 in file 602.

Server application 217 then generates and transmits a response 652 to request 650 that includes content spanning the byte offsets of 15,000 to 24,999 in the version of the media title. As shown, the response includes an optional first portion 660 that includes the same identifier as portions 630 and 654, a second portion 662 that includes 5,000 bytes spanning the byte offsets of 15,000 to 19,999 from S1 in file 600, and a third portion 664 that includes 5,000 bytes spanning the byte offsets of 10,000 to 14,999 from S2' in file 602. Response 652 may additionally be formatted so that the 10,000 bytes of data retrieved by server application 217 appear to be from a contiguous portion of a single file.

Figure 7:
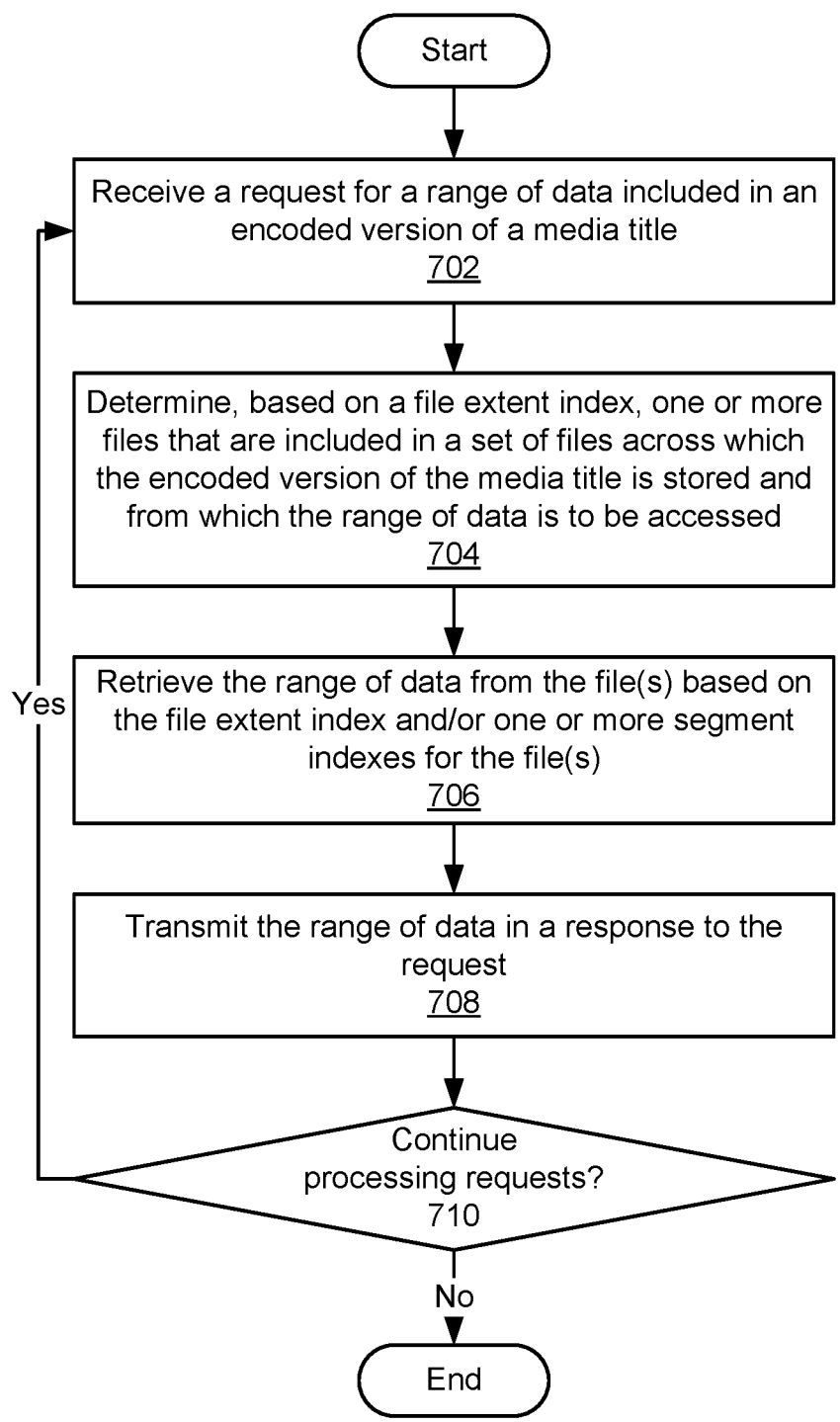
FIG. 7 is a flow diagram of method steps for accessing a media title for playback, according to various embodiments.

FIG. 7 is a flow diagram of method steps for accessing a media title for playback, according to various embodiments. Although the method steps are described in conjunction with the systems of FIGS. 1-6, persons skilled in the art will understand that any system configured to perform the method steps, in any order, is within the scope of the present invention.

As shown, server application 217 receives 702 a request for a range of data included in an encoded version of a media title. For example, server application 217 could receive the request from a client device (e.g., endpoint device 115) that provides streaming media functionality to an end user. The client device could include a legacy streaming video application, which requests ranges of data from a single file during playback of a media title instead of switching between files at certain points during the playback. The request could include an identifier (e.g., filename) for the file, a starting time or data offset for the range of data, and an ending time or data offset for the range of data. Alternatively, the request could specify a number of bytes (or seconds) of content to retrieve after the starting offset in lieu of the ending time or data offset.

Next, server application 217 determines 704, based on a file extent index, one or more files that are included in a set of files across which the encoded version of the media title is stored and from which the range of data is to be accessed. The set of files may overlap with other sets of files across which other encoded versions of the media title are stored. For example, multiple encoded versions of the media title could include a "base" or "original" version of content stored in one or more files, while each encoded version of the media title could include additional content that is specific to the version in the same file(s) and/or one or more different files. The file extent index includes the identifier for the encoded version of the media title and metadata related to the encoded version of the media title (e.g., a length of the encoded version, a modification time of the encoded version, a file extension to be included in a header for a response to the request, etc.). The file extent index also maps identifiers for the set of files to ranges of data stored in the files. Each range of data identifies at least a portion of the corresponding file to be included in the encoded version of the media title. In addition, the ordering of mappings between identifiers and the corresponding offset ranges in the file extent index reflects the order in which video content should be retrieved for end-to-end playback of the encoded version of the media title. Thus, the encoded version may be played from start to finish by retrieving the first range of data included in the first mapping within the file extent index from a first file represented by the first identifier in the first mapping, followed by retrieving the second range of data included in the second mapping within the file extent index from a second file represented by the second identifier in the second mapping, and so on.

Server application 217 also retrieves 706 the range of data from the file(s) based on the file extent index and/or one or more segment indexes for the file(s). More specifically, server application 217 may use mappings in the file extent index and/or segment index(es) to convert a starting offset for the range of data specified in the request into a first offset within a file identified in the file extent index. In general, this conversion may be performed via one or more computations or comparisons involving the starting offset and the number of bytes spanned by one or more ranges of data included in the first file extent index. After these computations or comparisons are performed, server application 217 is able to identify the file in which the starting offset is found, as well as the first offset in the file to which the starting offset corresponds.

For example, server application 217 could iteratively perform a summation of the number of bytes spanned by the first n ranges of data in mappings within the file extent index. Once the resulting sum is greater than the starting offset, server application 217 could identify the value of n that produced the sum and determine that the starting offset is located in a file represented by the nth mapping in the file extent index. Server application 217 could subtract the starting offset from the sum to obtain a "difference" value representing the number of bytes separating the first offset and the end of the range of data in the nth mapping. Server application 217 could then subtract the value from the end of the range of data in the nth mapping to obtain the first offset in the file from which the range of data specified in the request is to be retrieved. Alternatively, server application 217 could subtract the sum representing the number of bytes spanned by the first n−1 ranges of data in the file extent index from the starting offset to obtain a value representing the number of bytes separating the first offset and the start of the range of data in the nth mapping. Server application 217 could then add the value to the start of the range of data in the nth mapping to obtain the first offset in the file from which the range of data specified in the request is to be retrieved.

In another example, server application 217 could iteratively subtract the number of bytes spanned by each range of data in the file extent index from the starting offset, so that the nth iteration generates a value that is the result of subtracting the number of bytes spanned by the first n ranges of data in mappings within the file extent index from the starting offset. Using this iterative process, server application 217 could identify the lowest value of n that produces a negative number and determine that the starting offset is located in a file represented by the nth mapping in the file extent index. Because this negative number represents the numerical difference between the first offset and the end of the range of data in the nth mapping, server application 217 could calculate the first offset within the file that corresponds to the starting offset by summing this negative number and the end of the range of data in the nth mapping.

After the starting offset for the range of data specified in the request is converted into a first offset within a file identified in the file extent index, server application 217 may retrieve the number of bytes spanned by the range of data from the file and/or one or more other files identified in the file extent index. If the range of data specified in the request falls within the range of data in the nth mapping representing the file, server application 217 could retrieve the entire range of requested data from the file, starting at the first offset. If the range of data specified in the request does not fall within the range of data in the nth mapping representing the file (e.g., if the requested range of data spans a greater number of bytes than the number of bytes separating the first offset and the end of the range of data in the nth mapping representing the file), server application 217 could retrieve a first portion of the requested range of data from the first offset to the end of the range of data in the nth mapping. Server application 217 could retrieve a second portion of the requested range of data from the beginning of the range of data in the n+1th mapping to the end of the requested range of data or the end of the range of data in the n+1th mapping, whichever occurs first. If the end of the requested range of data exceeds the end of the range of data in the n+1th mapping, server application 217 could retrieve additional portions of requested data from files represented by subsequent mappings in the file extent index until the entire requested range of data is obtained.

When the request received in operation 702 specifies the range of data to be retrieved in terms of time offsets instead of integer offsets representing displacements of bytes (or other units of data) from the beginning of the encoded version of the media title, server application 217 uses mappings between time offsets and byte offsets in one or more segment indexes for the file(s) identified in operation 704 to convert a first time offset delineating the start of the range of data specified in the request into a first offset in a file represented by a mapping in the file extent index. For example, server application 217 could use segment indexes for all files represented by mappings in the file extent index to convert ranges of byte offsets in the file extent index into ranges of time offsets for the corresponding files. Server application 217 could optionally store these ranges of time offsets in the file extent index and/or another index structure. Server application 217 could then use these ranges of time offsets to identify one or more files from which data spanning the range specified in the request is to be retrieved. Server application 217 could further use one or more segment indexes for these file(s) to convert a starting and/or ending time offset in the requested range into a corresponding starting and/or ending offset in a file and retrieve data spanning the requested range(s) from the file(s).

Finally, server application 217 transmits 708 the range of data in a response to the request. For example, server application 217 includes the retrieved data, an identifier for the encoded version of the media title, a file extension specified in metadata from the file extent index for the encoded version, and/or other data or metadata in the response. Server application 217 then transmits the response to the client device over a network connection.

Server application 217 may continue processing 710 additional requests using operations 702-708. For example, server application 217 could process each request for a version of a media title that is stored across multiple files (or multiple non-contiguous segments within the same file) using a file extent index for the version of the media title, one or more file mappings between identifiers for the files and locations (e.g., paths) of the files, and/or one or more segment indexes for the files. Using these mappings and index structures, server application 217 could retrieve one or more portions of the range of data specified in each request within one or more ranges of offsets mapped to one or more of the files identified in the file extent index.

In sum, different versions of a media title are stored across multiple files and/or multiple segments within a given file. Each version of the media title may include one or more portions of content that are specific to the version (e.g., localized versions of scenes that include "burned in" text in different languages) and one or more portions that are shared with other versions of the media title (e.g., a base or default version of the media title). A request for a given version of the media title includes a range of data to be retrieved from video or other content for the version. This range can be specified in byte (or other data unit) offsets and/or time offsets within the video for the media title. When the requested version is stored across multiple files and/or non-contiguous segments, a file extent index for the version is used to retrieve the range of data in the request. The file extent index maps identifiers for files that store content for the version to ranges (e.g., specified in byte and/or time offsets) of data spanned by the content. The ordering of mappings between identifiers and the corresponding ranges of data in the file extent index additionally reflects the order in which video content should be retrieved for start-to-end playback of the version of the media title. To process the request, mappings in the file extent index and/or one or more segment indexes are used to convert one or more offsets that delineate the range of data to be retrieved into one or more corresponding offsets within files identified in the file extent index, and data that spans the range denoted by the corresponding offset(s) is retrieved from the corresponding files. The retrieved data is then returned in a response to the request for playback of the corresponding version of the media title on the client device from which the request was received.

One technical advantage of the disclosed techniques relative to the prior art is that, with the disclosed techniques, duplication of video content across multiple versions of a media title is reduced. In that regard, the disclosed techniques enable a single copy of video content that is common to all versions of a given film to be stored, instead of replicating identical video content across multiple files. Thus, with the disclosed techniques, fewer computational and storage resources are consumed when encoding and storing multiple versions of a media title for streaming. Another technical advantage of the disclosed techniques relative to the prior art is that the disclosed techniques allow a given version of the media title to be created or modified in an efficient, modular manner, unlike prior art approaches that encode and package a given version of a media title from beginning to end. These technical advantages provide one or more technological advancements over prior art approaches.

1. In some embodiments, a computer-implemented method for accessing a media title for playback comprises receiving from a client device a first request for a first range of data included in a first encoded version of the media title, wherein the first encoded version of the media title is stored across a first set of files, determining, based on a first file extent index, one or more files that are included in the first set of files and from which the first range of data is to be accessed, wherein, for each file included in the first set of files, the first file extent index maps an identifier for the file to a given range of data that is both stored in the file and is included in the first encoded version of the media title, retrieving the first range of data from the one or more files, wherein at least a portion of the first range of data retrieved from each of the one or more files falls within the given range of data that is stored in the file, and transmitting the first range of data to the client device in a response to the first request.

2. The computer-implemented method of clause 1, further comprising receiving a second request for a second range of data that begins at a first time offset in the first encoded version of the media title, and retrieving the second range of data based on the first file extent index and a first segment index for a first file included in the first set of files, wherein the first segment index maps one or more time offsets in the first encoded version to one or more offsets in the first file.

3. The computer-implemented method of clauses 1 or 2, wherein retrieving the second range of data based on the first file extent index and the first segment index comprises determining a first offset in the first file to which the first time offset is mapped in the first segment index, and retrieving, from the first file, at least a portion of the second range of data beginning at the first offset.

4. The computer-implemented method of any of clauses 1-3, wherein retrieving the second range of data based on the first file extent index and the first segment index comprises determining, based on the first file extent index, that the second range of data begins in the first file and ends in a second file, retrieving, from the first file, a first portion of the second range of data beginning at a first offset to which the first time offset is mapped in the first segment index and ending at a second offset to which a first identifier for the first file is mapped in the first file extent index, and retrieving, from the second file, a second portion of the second range of data beginning at a third offset to which a second identifier for the second file is mapped in the first file extent index and ending at a fourth offset to which a second time offset delineating an end of the second range of data is mapped in a second segment index for the second file.

5. The computer-implemented method of any of clauses 1-4, further comprising receiving a second request for a second range of data included in a second encoded version of the media title, wherein the second encoded version of the media title is stored across a second set of files that overlaps with the first set of files, determining, based on a second file extent index, one or more additional files that are included in the second set of files and from which the second range of data is to be accessed, wherein, for each additional file included in the second set of files, the second file extent index maps an identifier for the additional file to a given range of data that is both stored in the additional file and is included in the second encoded version of the media title, and retrieving the second range of data from the one or more additional files, wherein at least a portion of the second range of data retrieved from each of the one or more additional files falls within the given range of data that is stored in the additional file.

6. The computer-implemented method of any of clauses 1-5, wherein retrieving the first range of data from the one or more files comprises converting a starting offset in the first range of data into a first offset in a first file included in the first set of files, and retrieving a first portion of the first range of data from the first file, wherein the first portion begins at the first offset in the first file.

7. The computer-implemented method of any of clauses 1-6, wherein retrieving the first range of data from the one or more files further comprises retrieving a second portion of the first range of data from a second file, wherein the second portion ends at a second offset in the second file that corresponds to an end of the first range of data.

8. The computer-implemented method of any of clauses 1-7, wherein converting the starting offset in the first range of data into the first offset in the first file comprises identifying the first file based on the starting offset and a number of bytes spanned by one or more ranges of data included in the first file extent index, and calculating the first offset based on a difference between the starting offset and the number of bytes spanned by the one or more ranges of data.

9. The computer-implemented method of any of clauses 1-8, wherein the first set of files includes a first file that includes a first portion of the media title in a first language and a second file that includes the first portion of the media title in a second language.

10. The computer-implemented method of any of clauses 1-9, wherein the first file extent index includes a length of the first encoded version of the media title.

11. In some embodiments, a non-transitory computer readable medium stores instructions that, when executed by a processor, cause the processor to perform the steps of receiving from a client device a first request for a first range of data included in a first encoded version of a media title, wherein the first encoded version of the media title is stored across a first set of files, determining, based on a first file extent index and one or more file mappings between one or more file identifiers and one or more file locations, one or more files that are included in the first set of files and from which the first range of data is to be accessed, wherein, for each file included in the first set of files, the first file extent index maps an identifier for the file to a given range of data that is both stored in the file and is included in the first encoded version of the media title, retrieving the first range of data from the one or more files, wherein at least a portion of the first range of data retrieved from each of the one or more files falls within the given range of data that is stored in the file, and transmitting the first range of data to the client device in a response to the first request.

12. The non-transitory computer readable medium of clause 11, wherein the instructions further cause the processor to perform the steps of receiving a second request for a second range of data that begins at a first time offset in the first encoded version of the media title, and retrieving the second range of data based on the first file extent index and a first segment index for a first file included in the first set of files, wherein the first segment index maps one or more time offsets in the first encoded version to one or more offsets in the first file.

13. The non-transitory computer readable medium of clauses 11 or 12, wherein retrieving the second range of data based on the first file extent index and the first segment index comprises determining a first offset in the first file to which the first time offset is mapped in the first segment index, and retrieving, from the first file, at least a portion of the second range of data beginning at the first offset.

14. The non-transitory computer readable medium of any of clauses 11-13, wherein the first file includes a first segment from which the at least a portion of the second range of data is retrieved and a second segment that stores content included in a second encoded version of the media title.

15. The non-transitory computer readable medium of any of clauses 11-14, wherein the instructions further cause the processor to perform the steps of receiving a second request for a second range of data included in a second encoded version of the media title, and retrieving the second range of data from one or more additional files included in a second set of files based on a second file extent index for the second encoded version of the media title, wherein the second set of files overlaps with the first set of files.

16. The non-transitory computer readable medium of any of clauses 11-15, wherein retrieving the first range of data from the one or more files comprises converting a starting offset in the first range of data into a first offset in a first file included in the first set of files, retrieving a first portion of the first range of data from the first file, wherein the first portion begins at the first offset in the first file, and retrieving a second portion of the first range of data from a second file that follows the first file in the first file extent index.

17. The non-transitory computer readable medium of any of clauses 11-16, wherein converting the starting offset in the first range of data into the first offset in the first file comprises determining the first file based on a number of bytes spanned by one or more ranges of data included in the first file extent index, and calculating the first offset based on a difference between the starting offset and the number of bytes spanned by the one or more ranges of data.

18. The non-transitory computer readable medium of any of clauses 11-17, wherein the given range of data is specified in one or more byte offsets within the first file extent index.

19. The non-transitory computer readable medium of any of clauses 11-18, wherein the first file extent index includes at least one of a length of the first encoded version of the media title, a modification time of the first encoded version of the media title, or a file extension.

20. In some embodiments, a computer-implemented method for retrieving a media title for playback comprises transmitting to a server machine a first request for a first range of data included in a first encoded version of the media title, wherein the first encoded version of the media title is stored across a first set of files, the first range of data resides in one or more files included in the first set of files, and, for each file included in the first set of files, a first file extent index maps an identifier for the file to a given range of data stored in the file, receiving the first range of data from the server machine in response to the first request, and causing media content corresponding to the first range of data to be output for playback.

21. The computer-implemented method of clause 20, further comprising transmitting to the server machine a second request for a second range of data that begins at a first time offset in the first encoded version of the media title, wherein the first time offset is mapped to a first offset in a first file within a first segment index for the first file, and receiving the second range of data from the server machine in response to the second request.

22. The computer-implemented method of clauses 20 or 21, wherein at least a portion of the second range of data is retrieved from the first file beginning at the first offset.

23. The computer-implemented method of any of clauses 20-22, further comprising transmitting to the server machine a second request for a second range of data included in a second encoded version of the media title, wherein the second encoded version of the media title is stored across a second set of files that overlaps with the first set of files, the second range of data resides in one or more additional files included in the second set of files, and, for each additional file included in the second set of files, a second file extent index maps an identifier for the additional file to a given range of data stored in the additional file, and receiving the second range of data from the server machine in response to the second request.

24. The computer-implemented method of any of clauses 20-23, wherein at least a portion of the first range of data is retrieved from a first file included in the first set of files beginning at a first offset corresponding to a starting offset in the first range of data.

25. The computer-implemented method of any of clauses 20-24, wherein the first set of files includes a first file that includes an original version of a portion of the media title and a second file that includes an alternative version of the portion of the media title.

26. The computer-implemented method of any of clauses 20-25, wherein the alternative version comprises at least one of an edit to the original version, a regional version of the portion, or a version that meets criteria for a content rating.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for accessing a media title for playback, the method comprising:
    receiving from a client device a first request for a first range of data included in a first encoded version of the media title;
    determining, based on a first file extent index, a plurality of files across which the first encoded version of the media title is stored and from which the first range of data is to be accessed, wherein the first file extent index maps an identifier for the first encoded version of the media title to an identifier for each file included in the plurality of files, and wherein the first file extent index maps each identifier for each file to a given range of data that is stored in the file;
    retrieving the first range of data from the plurality of files; and
    transmitting the first range of data to the client device in a response to the first request.

2. The computer-implemented method of claim 1, wherein the first range of data is specified in one or more byte offsets within the first file extent index.

3. The computer-implemented method of claim 1, further comprising:
    receiving a second request for a second range of data that begins at a first time offset in the first encoded version of the media title; and
    retrieving the second range of data based on the first file extent index and a first segment index for a first file included in the plurality of files.

4. The computer-implemented method of claim 3, wherein the first segment index maps one or more time offsets in the first encoded version to one or more offsets in the first file.

5. The computer-implemented method of claim 3, wherein retrieving the second range of data based on the first file extent index and the first segment index comprises:
    determining a first offset in the first file to which the first time offset is mapped in the first segment index; and
    retrieving, from the first file, at least a portion of the second range of data beginning at the first offset.

6. The computer-implemented method of claim 1, wherein, the given range of data that is stored in each file included in the plurality of files also is included in the first encoded version of the media title.

7. The computer-implemented method of claim 1, wherein at least a portion of the first range of data retrieved from each filed included in the plurality of files falls within the given range of data that is stored in the file.

8. The computer-implemented method of claim 1, wherein retrieving the first range of data from the plurality of files comprises:
    converting a starting offset in the first range of data into a first offset in a first file included in the plurality of files; and
    retrieving a first portion of the first range of data from the first file, wherein the first portion begins at the first offset in the first file.

9. The computer-implemented method of claim 8, wherein retrieving the first range of data from the plurality of files further comprises retrieving a second portion of the first range of data from a second file included in the plurality of files, wherein the second portion ends at a second offset in the second file that corresponds to an end of the first range of data.

10. The computer-implemented method of claim 8, wherein converting the starting offset in the first range of data into the first offset in the first file comprises:
    identifying the first file based on the starting offset and a number of bytes spanned by one or more ranges of data included in the first file extent index; and
    calculating the first offset based on a difference between the starting offset and the number of bytes spanned by the one or more ranges of data.

11. The computer-implemented method of claim 1, wherein the plurality of files includes a first file that has a first portion of the media title in a first language and a second file that includes the first portion of the media title in a second language.

12. One or more non-transitory computer readable media storing instructions that, when executed by one or more processors, cause the one or more processors to perform the operations of:
    receiving a first request for a first range of data associated with a first encoded version of a media title;
    determining, based on a first index, a plurality of files across which the first encoded version of the media title is stored and from which the first range of data is to be accessed, wherein the first index maps an identifier for the first encoded version of the media title to an identifier for each file included in the plurality of files, and wherein the first index maps each identifier for each file to a given range of data that is stored in the file;
    retrieving the first range of data from the plurality of files; and
    transmitting the first range of data in a response to the first request.

13. The one or more non-transitory computer readable media of claim 12, wherein the first range of data is specified in one or more byte offsets within the first index.

14. The one or more non-transitory computer readable media of claim 12, further comprising:
  receiving a second request for a second range of data that begins at a first time offset in the first encoded version of the media title; and
  retrieving the second range of data based on the first index and a first segment index for a first file included in the plurality of files.

15. The one or more non-transitory computer readable media of claim 14, wherein the first segment index maps one or more time offsets in the first encoded version to one or more offsets in the first file.

16. The one or more non-transitory computer readable media of claim 14, wherein retrieving the second range of data based on the first index and the first segment index comprises:
  determining a first offset in the first file to which the first time offset is mapped in the first segment index; and
  retrieving, from the first file, at least a portion of the second range of data beginning at the first offset.

17. The one or more non-transitory computer readable media of claim 12, wherein, a given range of data that is stored in each file included in the plurality of files also is included in the first encoded version of the media title.

18. The one or more non-transitory computer readable media of claim 12, wherein at least a portion of the first range of data retrieved from each filed included in the plurality of files falls within a given range of data that is stored in the file.

19. The one or more non-transitory computer readable media of claim 12, wherein retrieving the first range of data from the plurality of files comprises:
  converting a starting offset in the first range of data into a first offset in a first file included in the plurality of files;
  retrieving a first portion of the first range of data from the first file, wherein the first portion begins at the first offset in the first file; and
  retrieving a second portion of the first range of data from a second file that follows the first file in the first index.

20. The one or more non-transitory computer readable media of claim 19, wherein retrieving the first range of data from the plurality of files further comprises retrieving a second portion of the first range of data from a second file included in the plurality of files, wherein the second portion ends at a second offset in the second file that corresponds to an end of the first range of data.

21. The one or more non-transitory computer readable media of claim 19, wherein converting the starting offset in the first range of data into the first offset in the first file comprises:
  identifying the first file based on the starting offset and a number of bytes spanned by one or more ranges of data included in the first index; and
  calculating the first offset based on a difference between the starting offset and the number of bytes spanned by the one or more ranges of data.

22. A system, comprising:
  one or more memories that include instructions; and
  one or more processors that are coupled to the one or more memories and,
    when executing the instructions, are configured to perform the operations of:
    receiving a first request for a first range of data associated with a first encoded version of a media title,
    determining, based on a first index, a plurality of files across which the first encoded version of the media title is stored and from which the first range of data is to be accessed, wherein the first index maps an identifier for the first encoded version of the media title to an identifier for each file included in the plurality of files, and wherein the first index maps each identifier for each file to a given range of data that is stored in the file,
    retrieving the first range of data from the plurality of files, and
    transmitting the first range of data in a response to the first request.

23. The system of claim 22, wherein, for each file included in the plurality of files, the first index maps an identifier for the file to a given range of data that is stored in the file.

* * * * *